United States Patent [19]

Marini et al.

[11] 3,932,259

[45] Jan. 13, 1976

[54] METHOD AND APPARATUS FOR THE MANUFACTURE OF SHEETS FOR HOLDING POSTAGE STAMPS OR THE LIKE

[76] Inventors: Adriana Marini, 7, Via Tancredi Gallimberti; Giacomo Marini, 35, Viale Quartara, both of Genoa, Italy

[22] Filed: June 27, 1973

[21] Appl. No.: 373,909

[30] Foreign Application Priority Data

July 7, 1972 Italy .......... 12772/72
May 25, 1973 Italy .......... 12639/73

[52] U.S. Cl. .......... 156/510; 156/261; 156/518; 156/265

[51] Int. Cl.² .......... B32B 31/10

[58] Field of Search .......... 156/268, 515, 528, 511, 156/513, 516, 543, 518, 546, 520, 548, 521, 552, 522, 553, 530, 556, 533, 578, 542, 580, 510; 161/18; 40/104.18, 158 R, 104.19, 159; 93/35 PC, 61 A; 83/236, 599, 272, 687, 566, 691, 569; 150/41; 118/35, 37

[56] References Cited

UNITED STATES PATENTS

| | | | |
|---|---|---|---|
| 1,762,539 | 6/1930 | Adams | 156/520 |
| 2,313,801 | 3/1943 | Carll | 83/691 |
| 2,367,490 | 1/1945 | Ducklo | 156/265 |
| 2,627,212 | 2/1953 | Connor et al. | 40/159 |
| 3,305,424 | 2/1967 | Hagner | 156/268 |
| 3,408,908 | 11/1968 | Berkowitz | 156/521 |
| 3,525,657 | 8/1970 | Svec | 156/261 |
| 3,610,547 | 10/1971 | Anderson | 156/515 |
| 3,642,552 | 2/1972 | Sibley | 156/217 |
| 3,709,110 | 1/1973 | Lubersky | 156/556 |
| 3,755,047 | 8/1973 | Larson | 156/510 |
| 3,764,440 | 10/1973 | Schroter et al. | 156/517 |

FOREIGN PATENTS OR APPLICATIONS

| | | | |
|---|---|---|---|
| 1,176,571 | 1/1970 | United Kingdom | 156/580 |

*Primary Examiner*—Douglas J. Drummond
*Assistant Examiner*—J. J. Gallagher
*Attorney, Agent, or Firm*—Larson, Taylor and Hinds

[57] ABSTRACT

Continuous lines of glue are applied on one side of a sheet of transparent material. A sheet of paper is thereafter brought into contact with the glued side of the said transparent sheet, and the said sheets are compressed together along selected lengths of the said glue lines, whilst subjecting the said transparent sheet to the action of a cutting device, which cuts the said transparent sheet along a prefixed pattern, without cutting the underlying paper sheet.

8 Claims, 19 Drawing Figures

422
222
2
1
322

85
84
83
82

322
2
1
422
222

82
83
XI
85
84
XI
83

1
12
122
122

METHOD AND APPARATUS FOR THE MANUFACTURE OF SHEETS FOR HOLDING POSTAGE STAMPS OR THE LIKE

BACKGROUND AND SUMMARY OF THE INVENTION

This invention relates to a mounting sheet for use in exhibiting postage stamps or similar sheet-like articles, comprising a support sheet having secured thereto a plurality of leaflets or strips of transparent flexible material, the said transparent material leaflets being secured to the support sheet by one edge, thus forming a pocket which is maintained in a closed condition only by the resilience of the flexible material.

Sheets of the above referred kind are known for instance from the Italian Pat. No. 618810.

The mounting sheets of the above referred kind have been heretofore produced in a manual way, that is by cutting the single leaflets of transparent material, and by glueing the said sheets to the support sheet.

This method of manufacture is time consuming and costly.

It is therefore the main object of the present invention to provide a method for the production of mounting sheets for philatelistic use or the like comprising the steps of applying to one side of a sheet of transparent flexible material continuous lines of glue, applying the said sheet of transparent material on a support sheet with the glued side of said sheet of transparent material in contact with one side of the support sheet, compressing the said two sheets together along selected lengths of the said lines of glue with a pressure sufficient to effect the glueing of the said transparent material sheet to the support sheet along the said lengths compressed together, and cutting the said transparent sheet along a prefixed pattern, without cutting the underlying support sheet.

Advantageously, the continuous lines of glue applied to the transparent material sheet are allowed to partially dry before the support sheet is brought into contact with the glued side of the transparent sheet, so as to assure that the glueing together of the said sheets takes place only along those lengths of the glue lines which are compressed together with a sufficient pressure.

It is a further object of the present invention to provide a machine for performing the above method, said machine comprising means for applying continuous parallel lines of glue on one side of a continuous sheet of transparent material, means for supplying the said glued sheet of transparent material to a punching platen press, means for supplying a support sheet to the said punching platen press, the said punching platen press being provided inside of its punches with means for compressing the selected lengths of the said glue lines on the support sheet, the said punches being adjusted so as to not cut the underlying support sheet, and means for expelling the spoil or discard portion of the said transparent sheet which was not glued to the said support sheet.

BRIEF DESCRIPTION OF THE DRAWINGS

The above and other features and advantages of the present invention will become evident from the following specification, made with reference to the accompanying drawings, in which.

DESCRIPTION OF THE PRODUCTS TO WHICH THE INVENTION IS DIRECTED

Figure 1A:
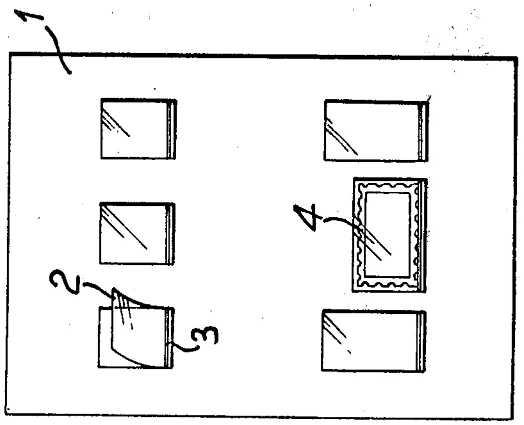
FIGS. 1A, 1B and 1C are examples of mounting sheets which may be manufactured according to the invention.
Figure 1B:
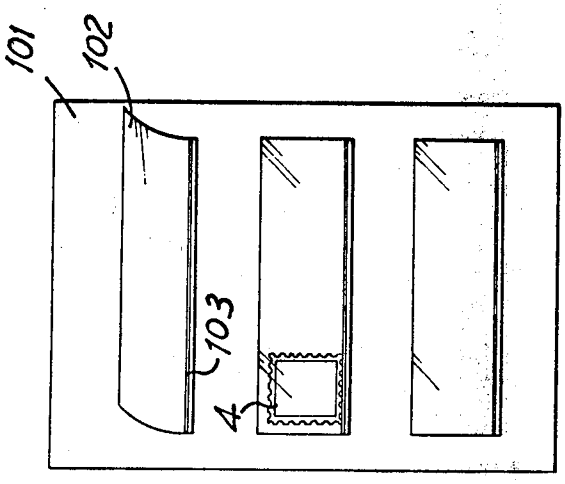
Figure 1C:
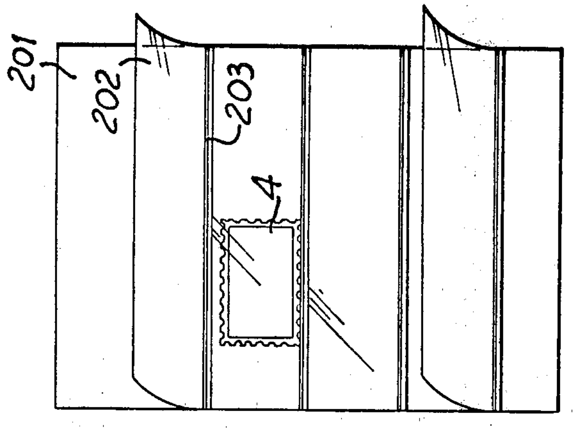

In FIGS. 1A to 1C, three examples of mounting sheets are shown, which may be produced with the apparatus according to the present invention.

The mounting sheet of FIG. 1A comprises a support sheet 1, which may be of paper, cardboard or other suitable material, and to one side of which there are secured a plurality of leaflets 2 of transparent flexible material, e.g., cellulose acetate, the leaflets 2 being secured to the support sheet 1 by narrow lines of adhesive 3 applied along a narrow portion at one edge of the leaflets, in such a manner that between the support sheet 1 and the leaflets 2 pockets are formed which are open along one edge as well both sides. The line of adhesive 3 extend along the lower edge of each leaflets. Inside of the thus formed pockets, stamps 4 may be easily inserted and elastically retained by a sufficient force.

In FIG. 1B a mounting sheet is shown, comprising a support sheet 101 to which a plurality of strips 102 of transparent material are secured by lines of adhesive 103 applied along their lower edges. The said strips 102 extend for a length which is less than the width of the support sheet 101.

In FIG. 1C a mounting sheet is shown, comprising a support sheet 201 to which a plurality of strips 202 of transparent material are secured by lines of adhesive 203 applied along their lower edges. The strips 203 have a length which is equal to the width of the support sheet.

Of course, the above are only examples of sheets which may be produced according to the invention. The following description will be made with particular reference to the production of a sheet of the kind shown in FIG. 1A.

DESCRIPTION OF THE APPARATUS ACCORDING TO THE INVENTION

Figure 2:
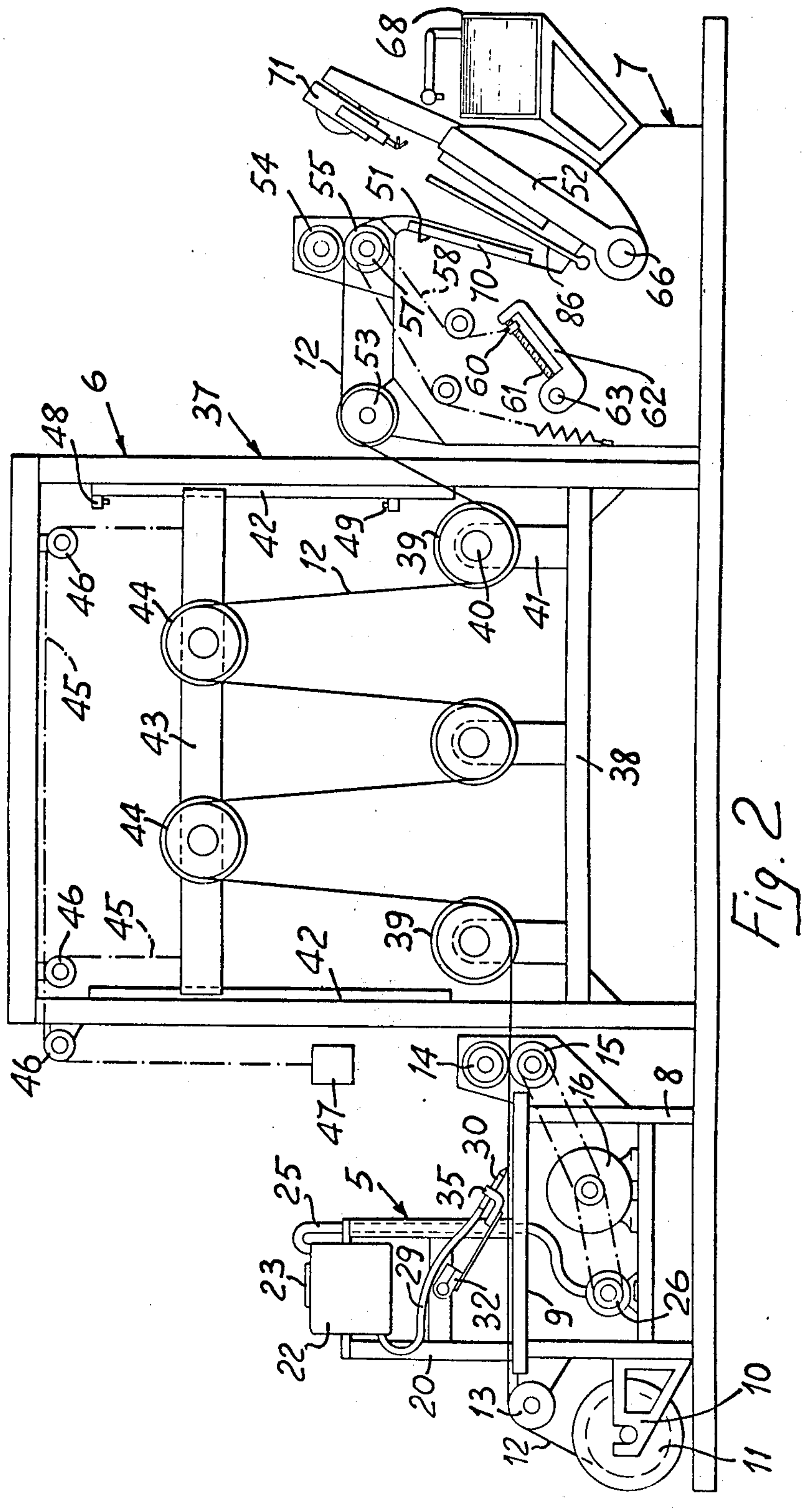
FIG. 2 is a side view of the machine for the manufacture of the mounting sheets.

With reference to FIG. 2 of the drawings, the machine shown comprises a glue applying device 5, for applying lines of glue to a continuous sheet of transparent plastic material, a storing device 6, for temporarily storing the said glued continuous sheet, and a device 7 for punching the leaflets of transparent material out of the continuous sheet of glued transparent material and for affixing the said leaflets to the support sheet.

DESCRIPTION OF THE GLUE APPLYING DEVICE

Figure 3:
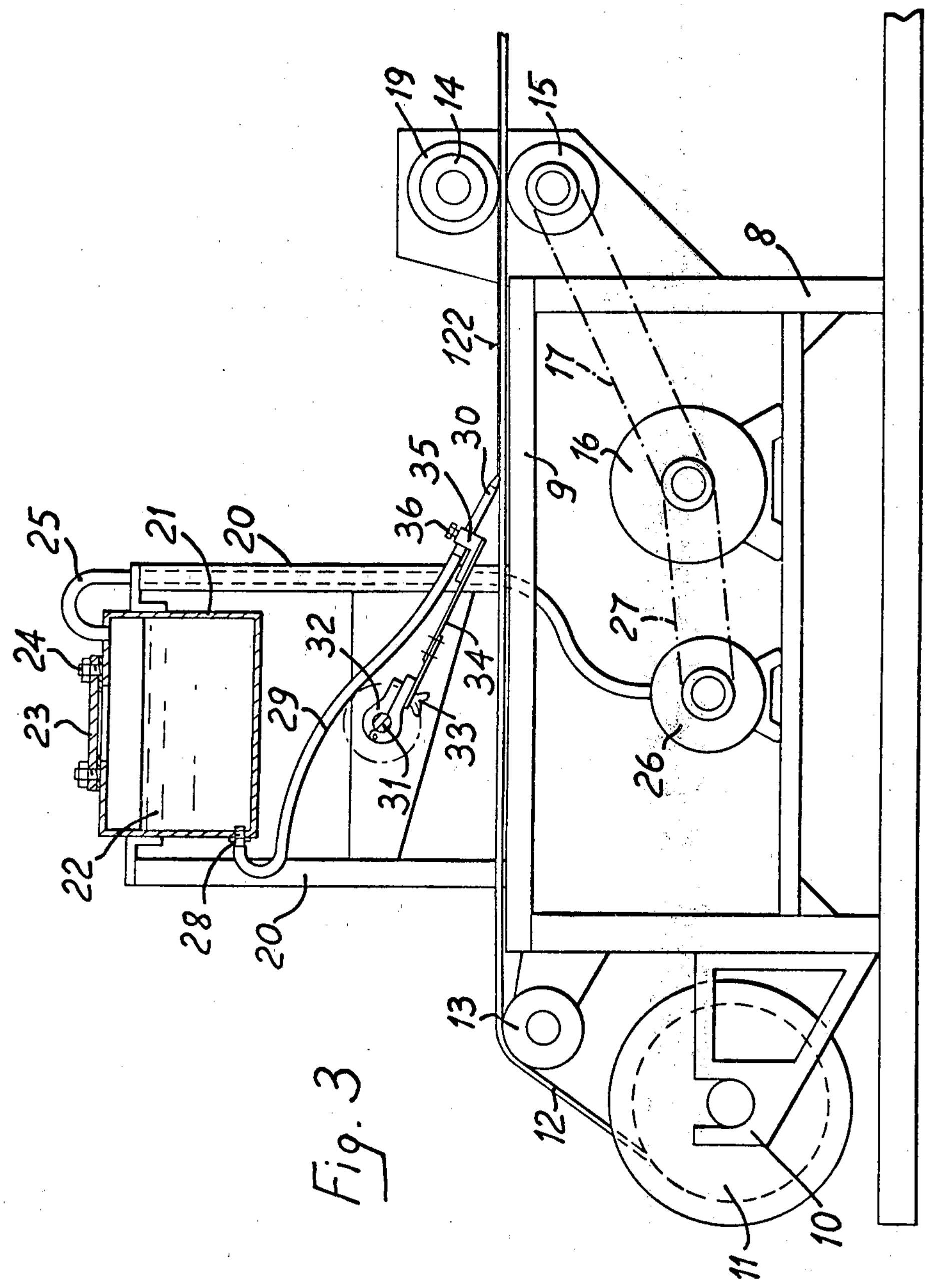
FIG. 3 is a side view, with parts sectioned away, of the glue applying device of the machine of FIG. 2.

With particular reference to FIG. 3, the glue applying device 5 comprises a base frame 8, provided with a working plane 9. At one end of the said frame 8 two bracket-like supports 10 are secured, between which the bobbin 11, on which the continuous sheet 12 of transparent material is wound, is rotatably supported. The said sheet 12 is advantageously made of cellulose acetate, or the like transparent flexible material. The sheet from bobbin 11 is passed around roller 13 along the working plane 9 up to a pair of cooperating driving rollers 14, 15, rotatably supported at the opposite end of frame 8. The roller 15 is driven by the motor 16, through a transmission 17.

Figure 4:
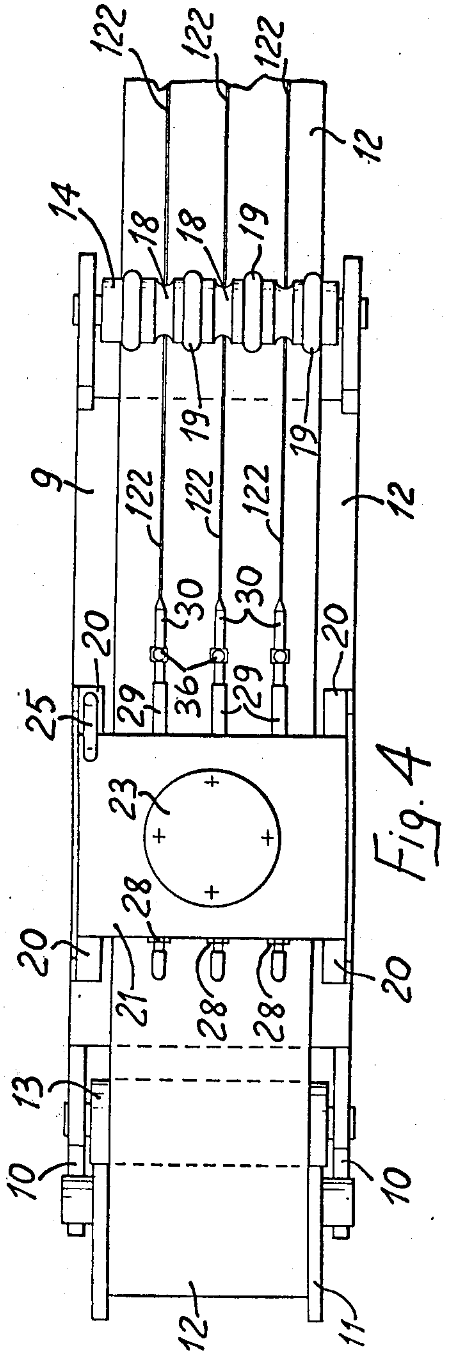
FIG. 4 is a top plan view of the device of FIG. 3.

As best shown in FIG. 4, the upper roller 14 is provided with parallel spaced annular grooves 18 and in some of the said grooves 18 there are housed the rubber rings 19, projecting partially outwardly from said grooves 18.

At both sides of working plane 9, the posts 20 are secured to frame 8, and to the said posts is in turn suspended the reservoir 21 for the glue 22. The reservoir 21 is air-tightly closed by a lid 23, which is tightened to the reservoir by means of the bolts 24. 26 is the pneumatic compressor which is operated by motor 16 through transmission 27. The output from compressor 26 is connected, through pipe 25, to the top of the reservoir 21. Near its bottom, the reservoir 21 is provided with a plurality of nipples 28, which are connected through hoses 29 to the glue-applying nozzles 30.

The nozzles 30 are supported in an adjustable manner between the posts 20. To this end, between the opposite pairs of posts 20, at a level below the bottom of reservoir 21, a transverse shaft 31 is supported, on which a plurality of split sleeves 32 are inserted. The said sleeves may be secured in any desired angular position on shaft 31, at the desired distance one from another by means of the tightening bolts 33. To each sleeve 32 a flexible arm 34, made for instance by a length of spring steel, is secured by one end, to the other end of said arm being secured a sleeve 35, in which the nozzle 30 may be inserted and fastened by means of a fastening screw 36.

Figure 5:
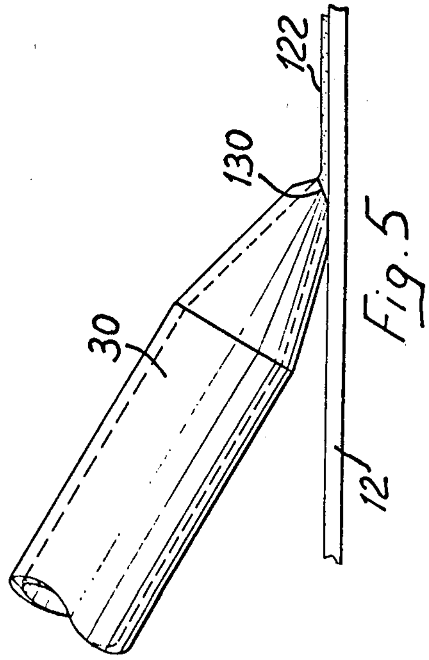
FIG. 5 is an enlarged view of the glue applying nozzle.

As best shown in FIG. 5, each nozzle 30 comprises a tubular body provided at one end with a tip-like extension having a calibrated port 130 through which a line of glue 122 is deposited onto the transparent sheet 12.

DESCRIPTION OF THE STORING DEVICE

Figure 7:
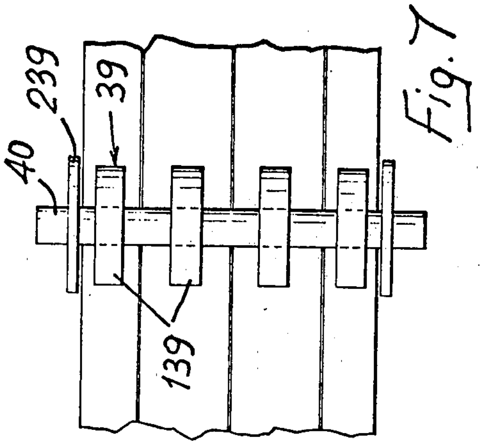
FIG. 7 is a top plan view of one roller of the device of FIG. 6.
Figure 6:
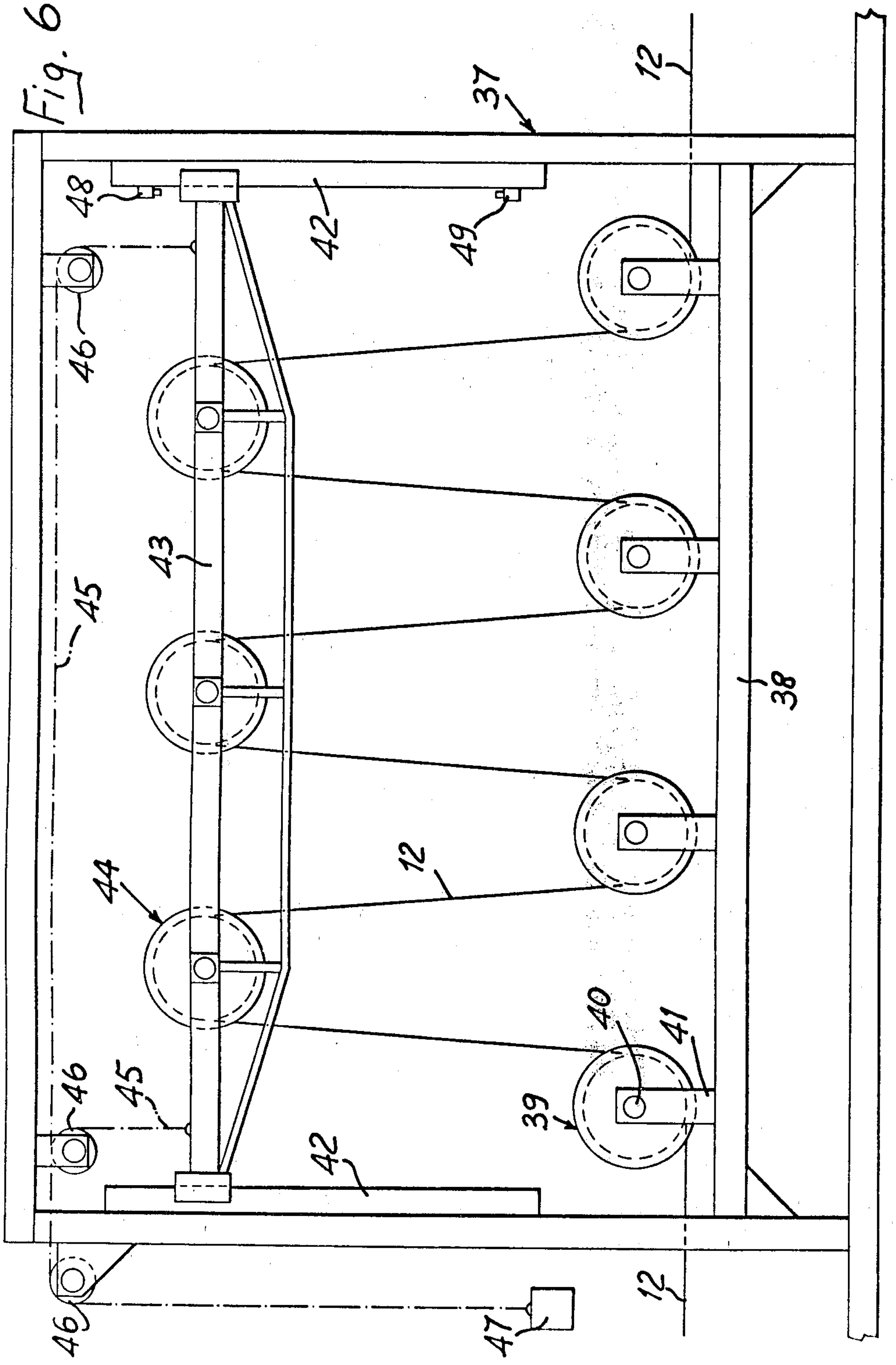
FIG. 6 is a side view of the storage device of the machine of FIG. 2.

With reference to FIGS. 6 and 7, the storing device comprises a frame 37, which is supported by the base frame 38. On the base frame 38 a number of parallel guide rollers 39 are rotatably supported about their shafts 40, by the end supports 41 secured to the base frame 38. The rollers 39 are each formed, as shown in FIG. 7, by a plurality of wheels 139 keyed to shaft 40. The said wheels 139 may be adjusted axially along shaft 40. At the ends of the rollers 39, an annular flange 239 is provided.

To the uprights of the frame 37 the vertical slide guides 42 are secured, guiding the movement of a counter-frame 43 on which a number of parallels rollers 44, are idly secured.

The counter-frame 43 is suspended through cables 45 and guide rollers 46, secured to the frame 37, to a counterweight 47. 48 and 49 are switches, which are secured to one of the slide guides 42.

The glued sheet 12 is guided from one reel 39 to the corresponding reel 44 of the movable counter frame 43, and again to one reel 39, and so on, the wheels 139 of the reels 39 being adjusted axially along shaft 40 in such a manner as to not bear on the glue lines 122, as clearly shown in FIG. 7.

DESCRIPTION OF THE PUNCHING AND MOUNTING SHEET FORMING DEVICE

Figure 8:
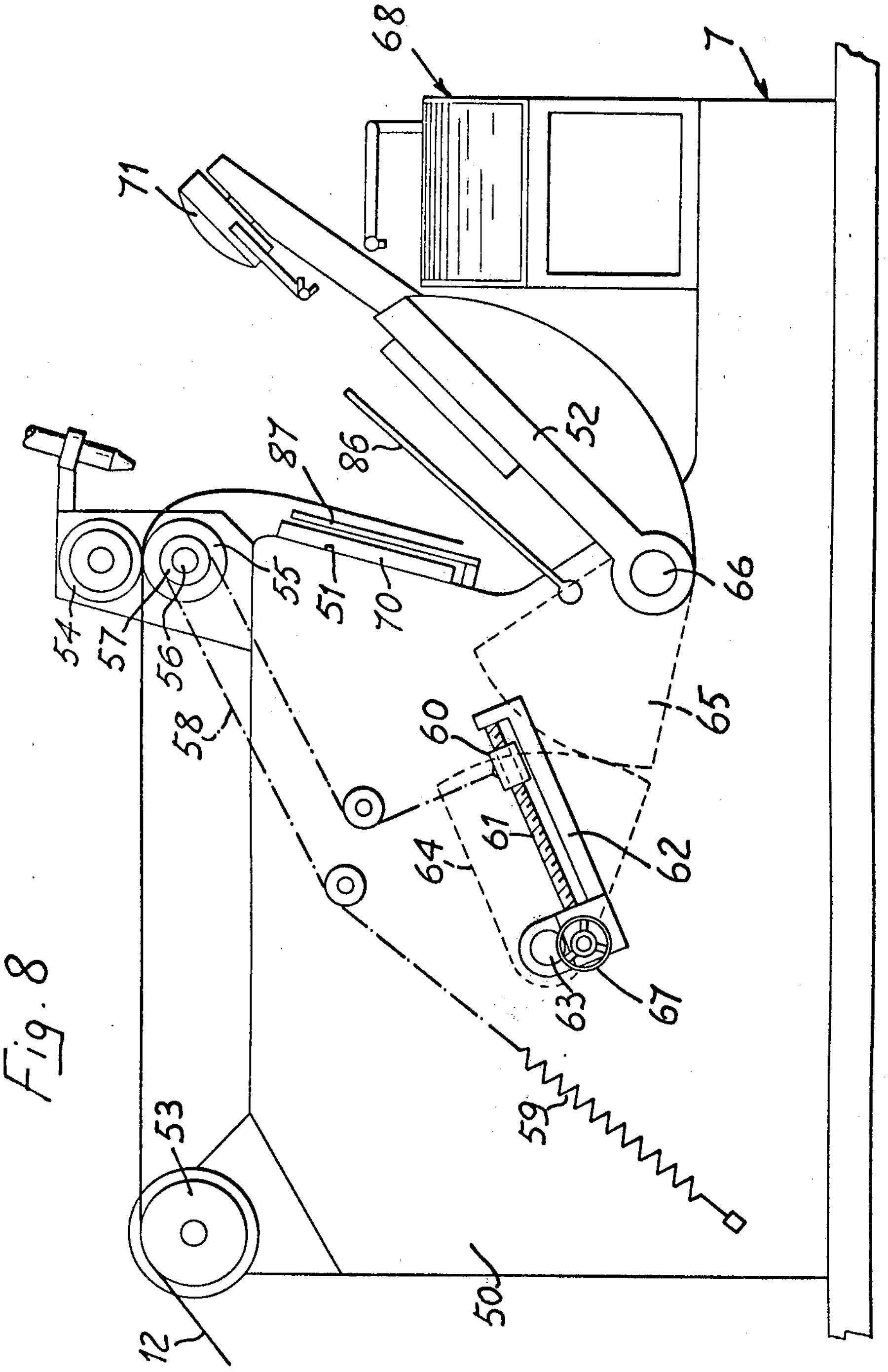
FIG. 8 is a side view of the punching press of the machine of FIG. 2.

In FIG. 8, the device is shown for the punching of the transparent leaflets out of the continuous sheet 12, and for the application of the punched leaflets to the base sheets 1.

The said device comprises basically a platen press type machine, comprising a base 50 to which the fixed plane 51 is secured, cooperating with the mobile plane or platen 52. To the end of the base 50 opposite to the one carrying the platen 52, a guide roller 53 is idly secured. To the frame 50, in a position above the fixed plane 51 a pair of cooperating feed rollers 54, 55 are supported. The rollers 54 and 55 are similar to rollers 14 and 15 of the glueing device 5, and are provided for the effect of stepwise feeding the sheet 12 to the platen press. To this end, on the shaft 56 of the roller 55 a chain wheel is keyed, with the interposition of free-wheel device 57. 58 is a chain, which is connected at one end to the one end of a spring 59, connected at its other end to the frame 50. The said chain 58 is in mesh with the chain wheel of the free-wheel device 57, and is connected at its other end to a sleeve 60 screwed onto a screw spindle 61 carried by a lever arm 62. The lever arm 62 is in turn keyed at one end to the shaft 63, on which the toothed sector 64 is keyed, in mesh with a toothed sector 65 keyed on shaft 66 which is the driving shaft on which the platen 52 is supported. The shaft 61 may be rotated by manually rotating wheel 67, coupled to shaft 61 in any suitable manner. By rotating shaft 61, the sleeve 60 is axially shifted along shaft 61, thus adjusting the length of the stroke of the chain 58, and therefore of the length of sheet 12 which is fed to the platen press by the rollers 54, 55.

71 is a mechanical feeder, which takes one sheet 1 at a time from the support sheet magazine 68 feeding it in the usual manner to the platen 52.

Figure 9:
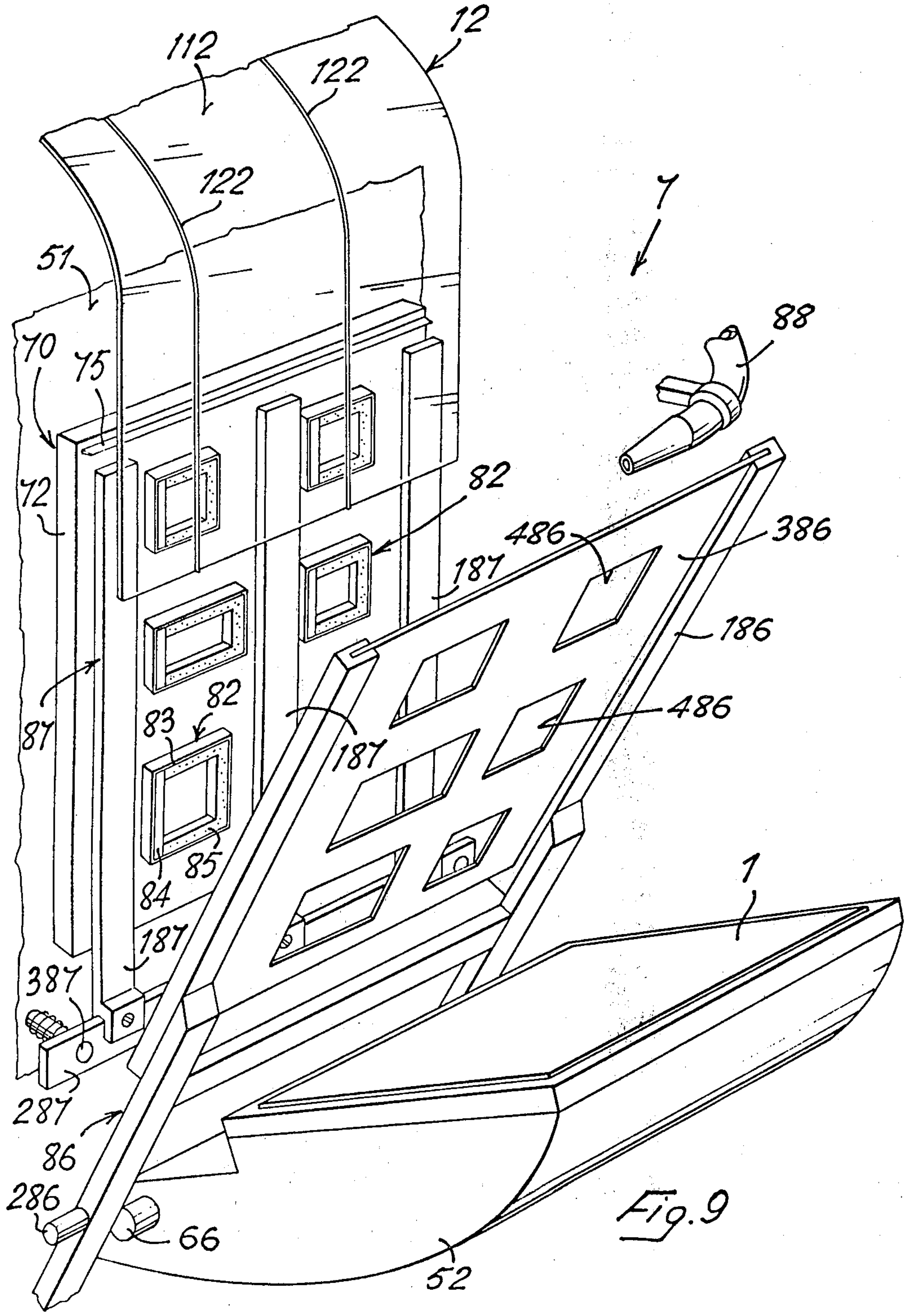
FIG. 9 is a perspective view of the punching platen arrangment of the device of FIG. 8.
Figure 17:
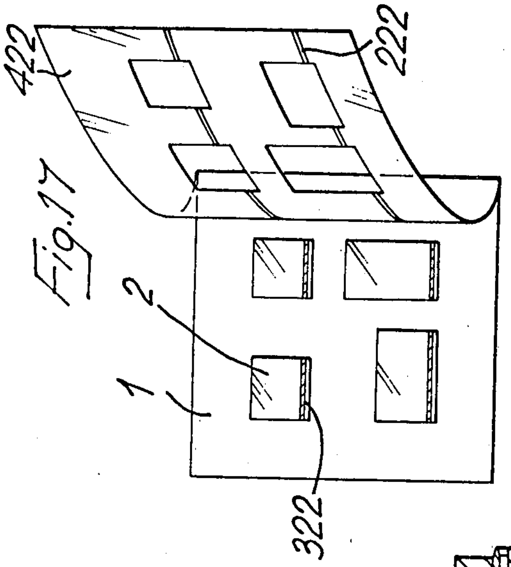
FIGS. 15, 16 and 17 diagrammatically show the operative sequences of the method according to the invention.
Figure 11:
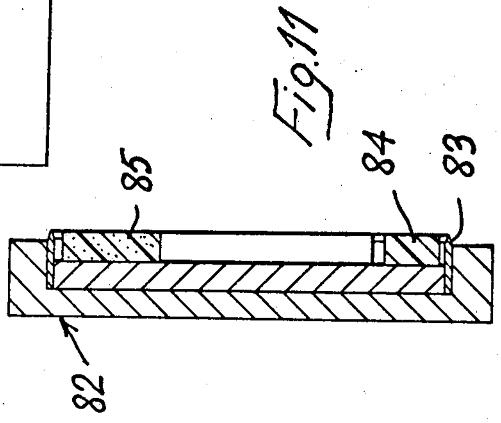
FIG. 11 is a section along line XI—XI of FIG. 10.
Figure 10:
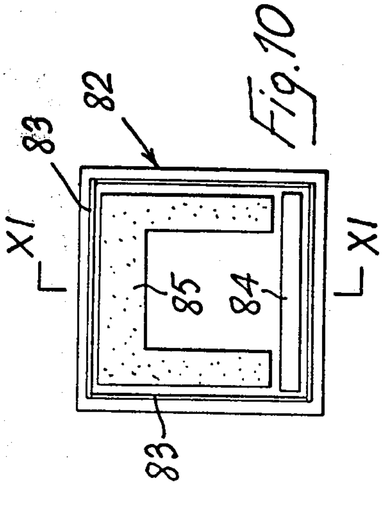
FIG. 10 is an enlarged view of one punch used in the device of FIG. 8.

To the fixed plane 51, the punching plate 70 is secured. The said punching plate 70 comprises, as best shown in FIG. 9, a base plate 72. Near the upper edge of the plate 72 a transversal cutting blade 75 is secured, for cutting a length of transparent sheet from the continuous sheet 12. To the base plate 72 the single punches 82 are secured. The said punches 82 comprise each, as best shown in FIGS. 10 and 11, four cutting blades 83, disposed so as to define a square area. Inside of the area defined by the blades 83, a pressure block 84 is secured. The said block 84 may for instance be made of hard rubber or the like material. The said block 84 is disposed near the edge of the punched leaflet which is to be glued to the support sheet 1. Elastic cushions 85, made for instance of foam rubber, are disposed inside of the area defined by the blades 83, along the remaing edges of the said area.

To the fixed plane 51 is also secured an expeller device 87. The said expeller device comprises a base strip member 287 extending beneath the plate 72 the whole length of said plate. The said base strip 287 is mounted movably to and from the fixed plane 51. To this end, to both ends of strip 287 the pins 387 are secured, extending inside of corresponding borings 487 formed in the fixed plane 51. A compression spring 587 is disposed coaxially to pins 387 between plane 51 and strips 287 and constantly urges the strip 287 away from plane 51, the said movement being limited by the abutment head 687 fixed to the free ends of pins 387. To the strip 287 the expeller lists 187 are secured, the said lists extending above plate 72 between the rows of punches 82 secured to said plate. Between the fixed plane 51 and the platen 52, a mobile contour template 86 is disposed. The said contour template comprises a frame 186, fulcrumed at 286 to the machine base 50, and driven concurrently with the platen 52. To the frame 186 the thin plate 386 is secured, the said plate being provided with perforations 486 following the contours of the single punches 82 secured to the punch plate 72.

OPERATION OF THE DESCRIBED MACHINE

Figure 12:
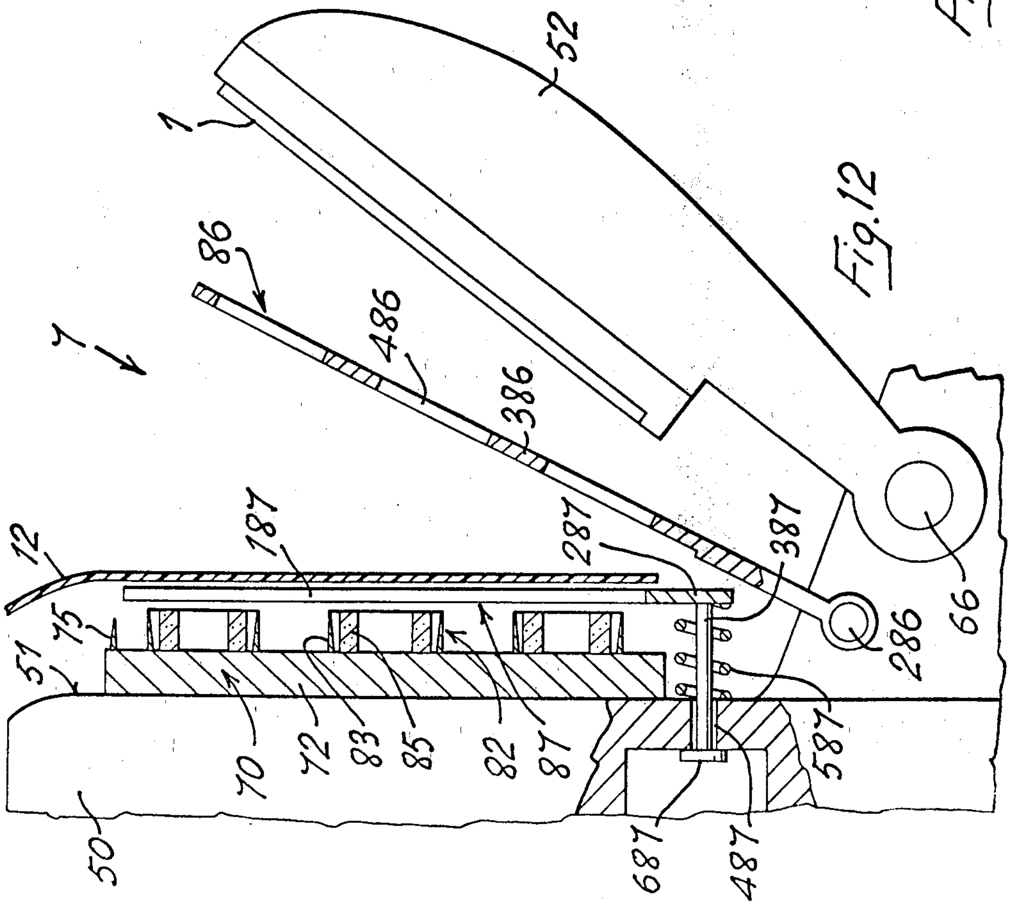
FIG. 12 is a side view, with parts sectioned, of the arrangment of FIG. 9, in a first operative step.
Figure 14:
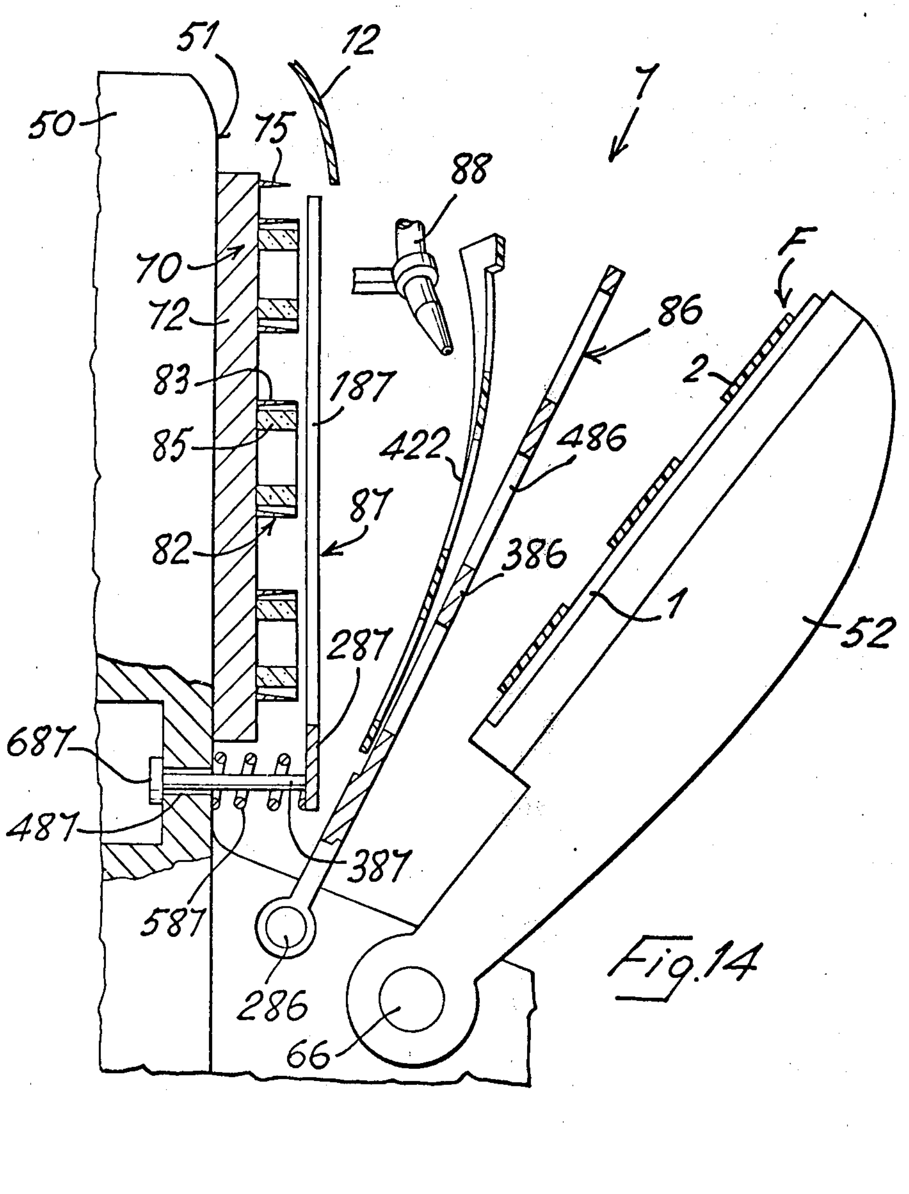
FIG. 14 is a view similar to FIG. 12, in a third operative step.

The mode of operation of the described machine is as follows:

At first, the nozzles 30 are adjusted in correspondence of the desired lines of glue 122. Also the rubber rings 19 are adjusted in the annular grooves 18 of roller 14. A similar adjustment is further effected for the wheels 139 of the rollers 39 and for the rubber rings of the roller 54. Thereafter, the motor 16 is started. The operation of motor 16 operates the compressor 26, which supplies compressed air through hose 25 in the reservoir 22. The motor 16 drives also the rollers 14, 15. The sheet 12 from reel 11 is passed beneath the nozzles 30 which apply to the sheet the desired lines of glue 122, and the glued sheet 12 is fed to the storing device 6, in which it is guided from rollers 39 to rollers 44. As soon as in the storing device 6 a sufficient length of the continuous sheet 12 is stored, the punching device 7 is operated. The movement in the opening direction of the platen 52 controls, through toothed sector 65, meshing the toothed sector 64, the oscillation of lever 62 in a direction in which it operates the chain 58, which in turn operates the roller 55, thus feeding a length of glued sheet 12 before the fixed plane 51 of the platen press. At the same time, the feeder 71 picks up a sheet 1 from the pile 68, depositing it on the receiving plane of the platen 52, as schematically shown in FIG. 12.

Figure 16:
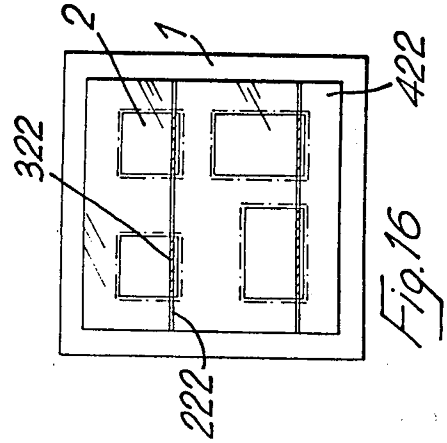
Figure 15:
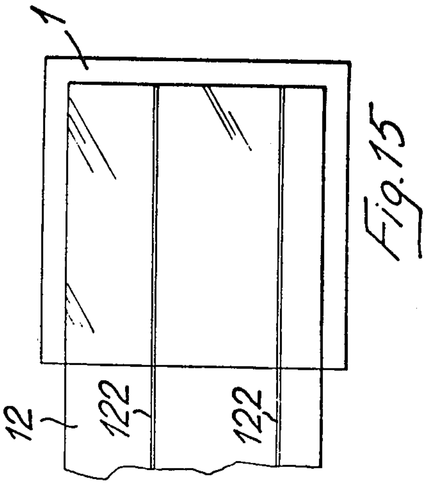
Figure 13:
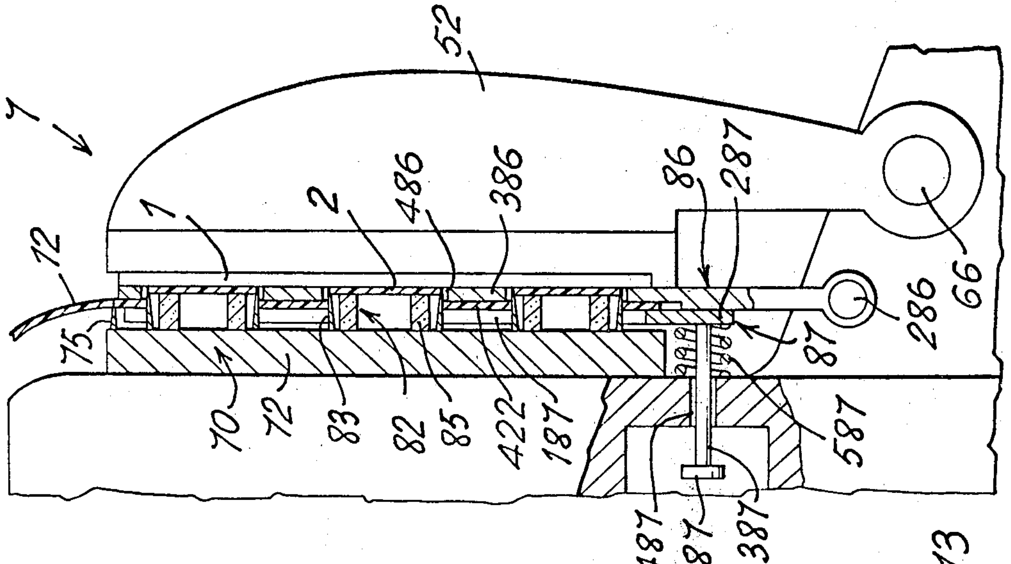
FIG. 13 is a view similar to FIG. 12, in a second operative step.

Subsequently, the platen 52 is closed against the fixed plane 51. Concurrently with the platen 52, also the contour template 86 is oscillated against the plane 51. The expeller device is compressed against the action of springs 587, as shown in FIG. 13. The closure of platen 52 results in the punching off of one section 422 of sheet 12, due to the action of blade 75. At the same time, the leaflets 2 are punched off of sheet 422 due to the action of the punches 82. The lines of glue 222 in correspondence of the lower edge of the leaflets 2 are compressed at 322 by the pressure block 84, thus glueing the said edges of the leaflets 2 onto the support sheet 1. The sequence of the above operations is shown in FIGS. 15 and 16. Subsequently, the platen 52 is again opened. In opening the platen 52, the produced mounting sheet is retained on the said platen, whilst the spoil section 422 of the transparent sheet 122 is retained on the template 86, and is blown out of the machine by the blowing nozzle 88.

The operation of the machine is thereafter repeated in the same manner.

It will be noticed that the purpose of the storing device 6 is to permit the passage from a continuously operating machine (the glue applying device) to a stepwise operating device (the platen press). Furthermore, the said device has the object of allowing the glue applied to the sheet 12 to partially dry, so that the lines of glue will adhere only when a sufficient compression is exerted on the said lines.

There is therefore a minimum time and a maximum time in which the operation must be performed. The said minimum and maximum times are set by the switches 48 and 49. Whenever the switch 48 is operated by the counter frame 43, the glue applying device is stopped. Whenever the switch 49 is operated, the platen press is temporarily stopped.

We claim:

1. A machine for manufacturing mounting sheets for philatelistic use or the like, comprising, means for applying a plurality of continuous spaced apart parallel lines of glue to one side of a continuous sheet of transparent material, means for supplying said glued sheet of transparent material to a punching press, said punching press including means for receiving and supporting a support sheet, said punching press having a punching means for simultaneously punching out of said transparent sheet a plurality of selected portions thereof, each of which portions include a segment of one of said lines of glue located along one edge thereof and facing the support sheet, and for compressing said portions against the support sheet, without cutting the support sheet, so as to cause the glue to adhere the selected portions to the support sheet with an unglued remainder of each portion being separable from the surface of the support sheet.

2. A machine according to claim 1, including a means for supplying a support sheet to said punching press.

3. A machine according to claim 2, further comprising between the said glue applying means and the said punching press, means for temporarily storing a length of the glued continuous transparent sheet.

4. A machine according to claim 2, in which the said means for applying each of said continuous parallel lines of glue to one side of a continuous sheet of transparent material comprises a glue applying nozzle connected to a glue reservoir, and means for translating the said continuous sheet of transparent material beneath said nozzles.

5. A machine according to claim 2, in which the said punching press comprises a fixed plane, at least one punch secured to said fixed plane, said punch comprising cutting means projecting into active position for a distance corresponding to the thickness of the transparent sheet, and elastic compression means disposed in the path of the glued lines of the said transparent sheet; a mobile plane cooperating sith the said fixed plane, and means for feeding between said fixed and mobile plane one length of transparent sheet and one support sheet.

6. A machine according to claim 3, in which the said storing means comprises a first set of rollers rotatably secured to a fixed frame, and a second set of rollers rotatably secured to a counter-frame movable to and fro relative to the said fixed frame.

7. A machine according to claim 5, further comprising between said fixed plane and said mobile plane a contour template mobile with the said mobile plane toward the fixed plane, the said transparent sheet being fed between said fixed plane and the contour template and the support sheet being fed between the contour template and the movable plane of the said punching press.

8. A machine according to claim 5, in which means are provided for expelling the discard portion of the transparent sheet from the said punching press.

* * * * *